US009255160B2

(12) United States Patent
Desjardins et al.

(10) Patent No.: US 9,255,160 B2
(45) Date of Patent: Feb. 9, 2016

(54) MULTI-METALLIC ZIEGLER-NATTA PROCATALYSTS AND CATAYSTS PREPARED THEREFROM FOR OLEFIN POLYMERIZATIONS

(75) Inventors: Sylvie Desjardins, Lake Jackson, TX (US); Mehmet Demirors, Pearland, TX (US); Ellen Donkers, Terneuzen (NL); Philip P. Fontaine, Houston, TX (US); Cristina Serrat, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 218 days.

(21) Appl. No.: 14/116,070

(22) PCT Filed: May 23, 2012

(86) PCT No.: PCT/US2012/039140
§ 371 (c)(1),
(2), (4) Date: Nov. 6, 2013

(87) PCT Pub. No.: WO2012/166469
PCT Pub. Date: Dec. 6, 2012

(65) Prior Publication Data
US 2014/0080970 A1     Mar. 20, 2014

Related U.S. Application Data

(60) Provisional application No. 61/491,924, filed on Jun. 1, 2011.

(51) Int. Cl.
*C08F 4/685*      (2006.01)
*C08F 10/02*      (2006.01)
*C08F 210/16*     (2006.01)

(52) U.S. Cl.
CPC .................. *C08F 4/685* (2013.01); *C08F 10/02* (2013.01); *C08F 210/16* (2013.01); *C08F 2410/03* (2013.01)

(58) Field of Classification Search
CPC ........................................ C08F 4/685
USPC .......................... 502/118, 129, 117
See application file for complete search history.

(56) References Cited

U.S. PATENT DOCUMENTS

| | | | |
|---|---|---|---|
| 3,754,154 A * | 8/1973 | Massie | H02K 33/14 310/17 |
| 4,120,820 A | 10/1978 | Birkelbach | |
| 4,224,186 A | 9/1980 | Lowery, Jr. et al. | |
| 4,308,369 A | 12/1981 | Shipley et al. | |
| 4,380,508 A | 4/1983 | Shipley et al. | |
| 4,399,053 A | 8/1983 | Shipley et al. | |
| 4,409,126 A | 10/1983 | Shipley et al. | |
| 4,421,674 A * | 12/1983 | Invernizzi | C08F 10/00 502/111 |
| 4,506,027 A * | 3/1985 | Invernizzi | C08F 10/00 502/111 |
| 4,612,300 A * | 9/1986 | Coleman, III | C08F 10/00 502/113 |
| 5,106,805 A * | 4/1992 | Bailly | C08F 10/00 502/104 |
| 6,054,406 A * | 4/2000 | Smith | C08F 10/00 502/107 |
| 6,084,042 A * | 7/2000 | Jaber | C08F 10/00 502/110 |
| 6,214,759 B1 * | 4/2001 | Chang | B01J 21/063 502/103 |
| 6,433,119 B1 | 8/2002 | Smith | |
| 6,677,266 B1 * | 1/2004 | De Rege Thesauro | C08F 10/00 502/104 |
| 6,762,145 B2 * | 7/2004 | Yang | C08F 10/02 502/103 |
| 6,930,071 B2 * | 8/2005 | Knoeppel | B01J 31/0212 502/103 |
| 7,473,664 B2 | 1/2009 | Vizzini et al. | |
| 8,809,220 B2 * | 8/2014 | Jorgensen | C08F 10/02 502/113 |
| 2002/0016255 A1 | 2/2002 | Job | |
| 2013/0317184 A1 * | 11/2013 | Masi | C08F 10/02 526/113 |

FOREIGN PATENT DOCUMENTS

| | | | | |
|---|---|---|---|---|
| EP | 423786 | | 4/1991 | |
| EP | 692 498 A1 * | 1/1996 | | C08F 10/00 |
| EP | 0692498 A1 | | 1/1996 | |
| FR | 2 672 606 A1 * | 8/1992 | | C08F 4/685 |
| FR | 2672606 A1 | | 8/1992 | |
| WO | 2004/018529 A2 | | 3/2004 | |
| WO | 2012084920 | | 6/2012 | |
| WO | WO 2012/084920 A1 * | 6/2012 | | C08F 10/02 |

OTHER PUBLICATIONS

Williams and Ward, The Construction of Polyethylene Calibration Curve for Gel Permeation Chromatography Using Polystyrene Fractions, J. Polym. Sci. Polym. Lett., Sep. 1968, vol. 6, pp. 621-624.
International Search Report and Written Opinion for PCT/US2012/039140, Mail Date Jul. 13, 2012, 9 Pages.
International Preliminary Report on Patentability for PCT/US2012/039140, Issue Date Dec. 2, 2013, 7 Pages.
Response to European Examination Report dated Oct. 9, 2014 for related EPO Application No. 12726961.1, 9 pages.
European Patent Office Summons to Attend Oral Proceedings Pursuant to Rule 115(1) EPC dated Jul. 30, 2015 for EPO Application No. 12726961.1, 4 pages.
Chinese First Office Action dated May 25, 2015 for counterpart Chinese Application No. 201280024766.2, 7 pages.
EP Office Action dated Oct. 9, 2014; from EP counterpart Application No. 12726961.1.

* cited by examiner

*Primary Examiner* — Rip A Lee

(57) ABSTRACT

Novel catalyst compositions comprising three or more transition metals are effective in increasing catalyst efficiency, reducing polydispersity, and increasing uniformity in molecular weight distribution when used in olefin, and particularly, linear low density polyethylene (LLDPE), polymerizations. The resulting polymers may be used to form differentiated products including, for example, films that may exhibit improved optical and mechanical properties.

10 Claims, No Drawings

MULTI-METALLIC ZIEGLER-NATTA PROCATALYSTS AND CATAYSTS PREPARED THEREFROM FOR OLEFIN POLYMERIZATIONS

CROSS-REFERENCE TO RELATED APPLICATIONS

This application is a non-provisional application claiming priority from the U.S. Provisional Patent Application No. 61/491,924 filed on Jun. 1, 2011, entitled "MULTI-METALLIC ZIEGLER-NATTA PROCATALYSTS AND CATALYSTS PREPARED THEREFROM FOR OLEFIN POLYMERIZATIONS," the teachings of which are incorporated by reference herein, as if reproduced in full hereinbelow.

BACKGROUND

1. Field of the Invention

The invention relates to Ziegler-Natta catalysts useful for olefin polymerizations. More particularly, it relates to multi-metallic Ziegler-Natta catalysts showing improved efficiency and properties in production of ethylene based polymers such as linear low density polyethylene (LLDPE) polymers in particular.

2. Background of the Art

Currently the demand for polyethylene worldwide is in excess of 80 million metric tons per year. Because there is a need for significant and continued differentiation of polymer products in the polyethylene business, researchers have devoted a great deal of effort to searching for process alterations that will yield such new products. One focus involves exploring new catalysts.

Ziegler-Natta catalysts have been used for many years in producing a variety of polyethylenes, including LLDPE. These catalysts generally include a magnesium halide support and one or two transition metal compounds. Though effective, these catalysts frequently result in LLDPE resins with broad polydispersity and undesirably broad short chain branching distribution (SCBD).

In LLDPE production, ethylene is generally copolymerized with a short-chain olefin comonomer (for example, 1-butene, 1-hexene and/or 1-octene). The resulting polymer is substantially linear but includes significant numbers of short branches, and these characteristics give it a higher tensile strength, higher impact strength and higher puncture resistance than those of low density polyethylene (LDPE). These improved properties, in turn, mean that lower thickness (gauge) films can be blown and the product exhibits improved environmental stress cracking resistance. LLDPE is used predominantly in film applications due to its toughness, flexibility and relative transparency. Product examples range from agricultural films, food protection wrap, and bubble wrap, to multilayer and composite films. Unfortunately, LLDPE tends to be somewhat more difficult overall to process than LDPE and may also be less tough and/or exhibit some less desirable optical properties.

In view of the above deficits in the performance of many known LLDPE polymers, it is desirable to identify process and/or compositional means and methods which can be employed in producing new, differentiated LLDPE polymers. Furthermore, it is desirable that such new means and/or methods offer process and product advancements such as enhanced catalyst efficiencies, narrower polydispersities, and narrower SCBD for improved uniformity of such products.

SUMMARY OF THE INVENTION

In a first embodiment, the present invention provides a process to prepare a tri-metallic procatalyst comprising (a) reacting a hydrocarbon-soluble organomagnesium compound or complex thereof and an active non-metallic or metallic halide to form a halogenated magnesium support; b) contacting the magnesium halide support with a conditioning compound containing an element selected from the group consisting of boron, aluminum, gallium, indium and tellurium under conditions sufficient to form a conditioned magnesium halide support; (c) contacting the conditioned magnesium halide support and a compound containing, as a first metal, titanium, to form a supported titanium compound; (d) contacting the supported titanium compound and a second metal and a third metal independently selected from the group consisting of zirconium, hafnium, vanadium, niobium, tantalum, chromium, molybdenum, and tungsten, provided that the second metal and the third metal are not the same; and further provided that the molar ratio of the magnesium to a combination of the titanium and the second and third metals ranges from 30:1 to 5:1; under conditions sufficient to form a multi-metallic procatalyst.

In a second embodiment, the present invention provides a multi-metallic procatalyst obtained according to the above process described in the above first embodiment.

In a third embodiment, the present invention provides a multi-metallic polymerization catalyst comprising the reaction product of the multi-metallic procatalyst as described above and an organometallic cocatalyst.

In a fourth embodiment, the present invention provides a polyethylene polymer prepared by a process wherein ethylene and optionally one or more olefin comonomers are polymerized in the presence of the tri-metallic polymerization catalyst, as described above.

In yet another aspect the invention provides an LLDPE polymer having a polydispersity of less than 3.50, optionally a high density fraction of less than 25 weight percent, and a molecular weight at comonomer content ratio (MWCCR) in the range of 0.75 to 1.1.

In still another aspect the invention provides an LLDPE polymer prepared by a process wherein the procatalyst composition described hereinabove is contacted with an organometallic cocatalyst such that a catalyst is formed; ethylene; and an olefin co-monomer; under conditions such that an LLDPE polymer having the above properties is formed.

In yet another aspect the invention provides an article prepared from this LLDPE polymer.

DETAILED DESCRIPTION OF THE EMBODIMENTS

The catalyst compositions of the invention may be defined herein as being at least trimetallic, but may also include more than three transition metals, and thus may in one embodiment be defined more comprehensively as multi-metallic. These three, or more, transition metals are specifically selected prior to production of the catalyst. While a wide variety of combinations is possible, all catalysts used in the invention include titanium as one element.

The catalyst compositions may be prepared beginning first with preparation of a conditioned magnesium halide based support. Preparation of a conditioned magnesium halide based support begins with selecting an organomagnesium compound or a complex including an organomagnesium compound. Such compound or complex is desirably soluble in an inert hydrocarbon diluent. The concentrations of components are preferably such that when the active halide, such as a metallic or non-metallic halide, and the magnesium complex are combined, the resultant slurry is from about 0.005 to about 0.2 molar (moles/liter) with respect to magnesium.

Examples of suitable inert organic diluents include liquefied ethane, propane, isobutane, n-butane, n-hexane, the various isomeric hexanes, isooctane, paraffinic mixtures of alkanes having from 5 to 10 carbon atoms, cyclohexane, methylcyclopentane, dimethylcyclohexane, dodecane, industrial solvents composed of saturated or aromatic hydrocarbons such as kerosene, naphthas, and combinations thereof, especially when freed of any olefin compounds and other impurities, and especially those having boiling points in the range from about −50° C. to about 200° C. Also included as suitable inert diluents are ethylbenzene, cumene, decalin and combinations thereof.

Suitable organomagnesium compounds and complexes may include, for example, magnesium C2-C8 alkyls and aryls, magnesium alkoxides and aryloxides, carboxylated magnesium alkoxides, and carboxylated magnesium aryloxides. Preferred sources of magnesium moieties may include the magnesium C2-C8 alkyls and C1-C4 alkoxides. Such organomagnesium compound or complex may be reacted with a metallic or non-metallic halide source, such as a chloride, bromide, iodide, or fluoride, in order to make a magnesium halide compound under suitable conditions. Such conditions may include a temperature ranging from −25° C. to 100° C., preferably 0° C. to 50° C.; a time ranging from 1 to 12 hours, preferably from 4 to 6 hours; or both. The result is a magnesium halide based support.

The magnesium halide support is then reacted with a selected conditioning compound containing an element selected from the group consisting of boron, aluminum, gallium, indium and tellurium, under conditions suitable to form a conditioned magnesium halide support. This compound and the magnesium halide support are then brought into contact under conditions sufficient to result in a conditioned magnesium halide support. Such conditions may include a temperature ranging from 0° C. to 50° C., preferably from 25° C. to 35° C.; a time ranging from 4 to 24 hours, preferably from 6 to 12 hours; or both. Without wishing to be bound by any theory of mechanism, it is suggested that this aging serves to facilitate or enhance adsorption of additional metals onto the support.

Once the conditioned support is prepared and suitably aged, it is brought into contact with a titanium compound. In certain preferred embodiments titanium halides or alkoxides, or combinations thereof, may be selected. Conditions may include a temperature within the range from 0° C. to 50° C., preferably from 25° C. to 35° C.; a time from 3 hours to 24 hours, preferably from 6 hours to 12 hours; or both. The result of this step is adsorption of at least a portion of the titanium compound onto the conditioned magnesium halide support.

Finally, two additional metals, referred to herein as "the second metal" and "the third metal" for convenience, will also be adsorbed onto the magnesium based support. The "second metal" and the "third metal" are independently selected from zirconium (Zr), hafnium (Hf), vanadium (V), niobium (Nb), tantalum (Ta), chromium (Cr), molybdenum (Mo), and tungsten (W). These metals may be incorporated in any of a variety of ways known to those skilled in the art, but generally contact between the conditioned magnesium based halide support including titanium and the selected second and third metals, in, e.g., liquid phase such as an appropriate hydrocarbon solvent, will be suitable to ensure deposition of the additional metals to form what may now be referred to as the "procatalyst," which is a multi-metallic procatalyst.

The multi-metallic procatalyst has a molar ratio constitution that is specific and which is believed to be an important feature in ensuring the desirable polymer properties that may be attributed to the catalyst made from the procatalyst. Specifically, the procatalyst desirably exhibits a molar ratio of the magnesium to a combination of the titanium and the second and third metals that ranges from 30:1 to 5:1; under conditions sufficient to form a multi-metallic procatalyst. Thus, the overall molar ratio of magnesium to titanium ranges from 8:1 to 80:1.

Once the procatalyst has been formed, it may be used to form a final catalyst by combining it with a cocatalyst consisting of at least one organometallic compound such as an alkyl or haloalkyl of aluminum, an alkylaluminum halide, a Grignard reagent, an alkali metal aluminum hydride, an alkali metal borohydride, an alkali metal hydride, an alkaline earth metal hydride, or the like. The formation of the final catalyst from the reaction of the procatalyst and the organometallic cocatalyst may be carried out in situ, or just prior to entering the polymerization reactor. Thus, the combination of the cocatalyst and the procatalyst may occur under a wide variety of conditions. Such conditions may include, for example, contacting them under an inert atmosphere such as nitrogen, argon or other inert gas at temperatures in the range from 0° C. to 250° C., preferably from 15° C. to 200° C. In the preparation of the catalytic reaction product, it is not necessary to separate hydrocarbon soluble components from hydrocarbon insoluble components. Time for contact between the procatalyst and cocatalyst may desirably range, for example, from 0 to 240 seconds, preferably from 5 to 120 seconds. Various combinations of these conditions may be employed.

Once the catalyst compositions of the invention have been prepared, they are suitable to use for olefin polymerizations. In particular embodiments these are slurry (wherein the polymer is not dissolved in the carrier) or solution (wherein the temperature is high enough to solubilize the polymer in the carrier) polymerizations, or the like, to prepare LLDPE. In general this may be carried out generally in a reaction medium, such as an isoparaffin or other aliphatic hydrocarbon diluents, with the olefin, or a combination of olefins, being brought into contact with the reaction medium in the presence of the selected catalyst, preferably as the sole catalyst. Conditions may be any that are suitable, and a molecular weight regulator, frequently hydrogen, is often present in the reaction vessel in order to suppress formation of undesirably high molecular weight polymers.

The polymers of the present invention can be homopolymers of C2-C20 alpha-olefins, such as ethylene, propylene, or 4-methyl-1-pentene, or they may be interpolymers of ethylene or propylene with at least one or more alpha-olefins and/or C2-C20 acetylenically unsaturated monomers and/or C4-C18 diolefins. They may also be interpolymers of ethylene with at least one of the above C3-C20 alpha-olefins, diolefins and/or acetylenically unsaturated monomers in combination with other unsaturated monomers. Those skilled in the art will understand that selected monomers are desirably those that do not destroy conventional Ziegler-Natta catalysts. For example, in one embodiment ethylene or a mixture of ethylene and from about 0.1 to about 20 weight percent (wt %), for example, from about 0.1 to about 15 wt %, or in the alternative, from about 0.1 to about 10 wt %; or in the alternative, from 0.1 to about 5 weight percent of 1-hexene, 1-octene, or a similar higher α-olefin, based on total monomer in the final copolymer, may be successfully polymerized using the inventive process.

In the polymerization process employing the aforementioned catalytic reaction product, polymerization is effected by adding a catalytic amount of the inventive catalyst composition to a polymerization reactor containing the selected α-olefin monomer, or vice versa. The polymerization reactor is maintained at temperatures in the range from 150° C. to 300° C., preferably at solution polymerization temperatures, e.g., from 150° C. to 250° C., for a residence time, in certain non-limiting embodiments, ranging from 5 minutes to 20 minutes. Longer or shorter residence times may alternatively be employed. It is generally desirable to carry out the polymerization in the absence of moisture and oxygen and in the presence of a catalytic amount of the catalytic reaction product that is typically within the range from 0.0001 to about 0.01 milligram-atoms transition metal per liter of diluent. It is understood, however, that the most advantageous catalyst concentration will depend upon polymerization conditions such as temperature, pressure, solvent and the presence of catalyst poisons and that the foregoing range is given for illustrative purposes of one particular but non-limiting embodiment only.

For example, pressures may be relatively low, e.g., from 150 to 3,000 psig (1.0 to 20.7 MPa), preferably from 250 to 1,000 psig (1.7 to 6.9 MPa), most preferably from 450 to 800 psig (3.1 to 5.5 MPa). However, polymerization within the scope of the invention can occur at pressures from atmospheric up to pressures determined by the capabilities of the polymerization equipment.

Generally in the polymerization process, a carrier which may be an inert organic diluent or solvent or excess monomer is generally employed. Generally care is desirably taken to avoid oversaturation of the solvent with polymer. If such saturation occurs before the catalyst becomes depleted, the full efficiency of the catalyst may not be realized. In particular embodiments, it may be preferable that the amount of polymer in the carrier not exceed 30 percent, based on the total weight of the reaction mixture. It may also be very desirable to stir the polymerization components in order to attain desirable levels of temperature control and to enhance the uniformity of the polymerization throughout the polymerization zone. For example, in the case of relatively more rapid reactions with relatively active catalysts, means may be provided for refluxing monomer and diluent, if diluent is included, thereby removing some of the heat of reaction. In any event, adequate means should be provided for dissipating the exothermic heat of polymerization. Thus, polymerization may be effected in a batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

In order to enhance catalyst efficiency in the polymerization of ethylene, it may also be desirable to maintain a certain ethylene concentration in the diluents in order to ensure reactor stability and, preferably, optimize catalyst efficiency. In some embodiments this may include a ratio of solvent to ethylene ranging from 1:2 to 1:8, preferably 1:3 to 1:5. To achieve this when an excess of ethylene is fed into the system, a portion of the ethylene can be vented.

Hydrogen is often employed in the practice of this invention, for the purpose of lowering the molecular weight of the resultant polymer. For the purpose of the invention, it is beneficial to employ hydrogen in the polymerization mixture in concentrations ranging preferably from 0.001 to 1 mole per mole of monomer. The larger amounts of hydrogen within this range may be useful to produce generally lower molecular weight polymer. It is generally known to those skilled in the art that hydrogen may be added to the polymerization vessel either with a monomer stream, or separately therefrom, before, during or after addition of the monomer to the polymerization vessel. However, in preferred embodiments it is highly desirable to ensure that the hydrogen is added either before or during addition of the catalyst, in the range of from 200,000 to 3 million grams of polymer per gram of Ti, such as, for example, from 600,000 to 2 million grams of polymer per gram of Ti.

The resulting polymer may be effectively recovered from the polymerization mixture by driving off unreacted monomer and diluent, where such is employed. No further removal of impurities is required. The resultant polymer may contain small amounts of catalyst residue as shown in the succeeding examples and also possess a relatively narrow molecular weight distribution. The resulting polymer may further be melt screened. Subsequent to the melting process in the extruder, the molten composition is passed through one or more active screens, positioned in series of more than one, with each active screen having a micron retention size of from about 2 μm to about 400 μm (2 to $4 \times 10^{-5}$ m), and preferably about 2 μm to about 300 μm (2 to $3 \times 10^{-5}$ m), and most preferably about 2 μm to about 70 μm (2 to $7 \times 10^{-6}$ m), at a mass flux of about 5 to about 100 lb/hr/in$^2$ (1.0 to about 20 kg/s/m$^2$). Such further melt screening is disclosed in U.S. Pat. No. 6,485,662, which is incorporated herein by reference to the extent that it discloses melt screening.

The resulting polymer may, in certain particularly preferred embodiments, be prepared such that it has properties that include a polydispersity of less than 3.50 and a MWCCR of less than 1.10, preferably from 0.75 to 1.10. The resulting polymer may optionally have a high density fraction of less than 25 weight percent.

The polyethylene composition according to instant invention has a density in the range of 0.900 to 0.960 g/cm$^3$. All individual values and subranges from 0.900 to 0.960 g/cm$^3$ are included herein and disclosed herein; for example, the density can be from a lower limit of 0.900, 0.911, 0.919, 0.923, 0.928, or 0.936 g/cm$^3$ to an upper limit of 0.941, 0.947, 0.954, 0.959, or 0.960, g/cm$^3$. For example, the polyethylene composition may have a density in the range of 0.905 to 0.945 g/cm$^3$; or in the alternative, the polyethylene composition may have a density in the range of 0.910 to 0.935 g/cm$^3$; or in the alternative, the polyethylene composition may have a density in the range of from 0.915 to 0.925 g/cm$^3$.

The polyethylene composition according to the instant invention has a molecular weight distribution ($M_w/M_n$) (measured according to the conventional GPC method) in the range of 2.6 to 4.2. All individual values and subranges from 2.6 to 4.2 are included herein and disclosed herein; for example, the molecular weight distribution ($M_w/M_n$) can be from a lower limit of 2.6, 2.8, 3.0, 3.2, or 3.3 to an upper limit of 2.8, 3.0, 3.2, 3.3, 3.8, or 4.2. In non-limiting example, the polyethylene composition may have a molecular weight distribution ($M_w/M_n$) in the range of from 2.6 to 3.6; or in the alternative, the polyethylene composition may have a molecular weight distribution ($M_w/M_n$) in the range of from 2.6 to 3.2.

The polyethylene composition according to the instant invention has a melt index ($I_2$) in the range of 0.1 to 50 g/10 minutes. All individual values and subranges from 0.1 to 50 g/10 minutes are included herein and disclosed herein; for example, the melt index ($I_2$) can be from a lower limit of 0.1, 0.5, 0.8, 1, 2, 3, 5, 6, 7, or 8 g/10 minutes, to an upper limit of 0.5, 0.8, 1, 2, 3, 5, 6, 7, 8, or 10 g/10 minutes. In non-limiting example, the polyethylene composition may have a melt index ($I_2$) in the range of from 0.2 to 20 g/10 minutes; or in the alternative, the polyethylene composition may have a melt index ($I_2$) in the range of from 0.5 to 5 g/10 minutes.

The polyethylene composition according to the instant invention has a melt flow ratio ($I_{10}/I_2$) in the range of from 6 to 12. All individual values and subranges from 6 to 12 are included herein and disclosed herein; for example, the melt flow ratio ($I_{10}/I_2$) can be from a lower limit of 6, 7, 8, 9, 10, or 11 to an upper limit of 7, 8, 9, 10, 11, or 12. For example, the polyethylene composition may have a melt flow ratio ($I_{10}/I_2$) in the range of from 6 to 10; or in the alternative, the polyethylene composition may have a melt flow ratio ($I_{10}/I_2$) in the range of from 6.5 to 8.

The polyethylene composition according to the instant invention has a molecular weight ($M_w$) in the range of 50,000 to 300,000 daltons.

The polyethylene composition may have a molecular weight at density ratio (MWCCR) in the range of from 0.75 to 1.10. All individual values and subranges from 0.75 to 1.10 are included herein and disclosed herein; for example, the polyethylene composition may have a MWCCR in the range of from 0.75, 0.80, 0.85, 0.90, 1.0, or 1.05 to 0.80, 0.85, 0.90, 1.0, or 1.1. The polyethylene composition may have a vinyl unsaturation in the range of 0.10 to 0.50 vinyls per one thousand carbon atoms present in the backbone of the polyethylene composition. All individual values and subranges from 0.15 to 0.35 are included herein and disclosed herein; for example, the polyethylene composition may have a vinyl unsaturation of less than 0.20 vinyls per one thousand carbon atoms present in the backbone of the polyethylene composition; or in the alternative, the polyethylene composition may have a vinyl unsaturation of less than 0.30 vinyls per one thousand carbon atoms present in the backbone of the polyethylene composition.

The polyethylene composition may comprise less than 20 percent by weight of units derived from one or more α-olefin comonomers. All individual values and subranges from less than 20 weight percent are included herein and disclosed herein; for example, the polyethylene composition may comprise less than 15 percent by weight of units derived from one or more α-olefin comonomers; or in the alternative, the polyethylene composition may comprise less than 12 percent by weight of units derived from one or more α-olefin comonomers; or in the alternative, the polyethylene composition may comprise less than 9 percent by weight of units derived from one or more α-olefin comonomers; or in the alternative, the polyethylene composition may comprise less than 7 percent by weight of units derived from one or more α-olefin comonomers; or in the alternative, the polyethylene composition may comprise less than 5 percent by weight of units derived from one or more α-olefin comonomers; or in the alternative, the polyethylene composition may comprise less than 3 percent by weight of units derived from one or more α-olefin comonomers; or in the alternative, the polyethylene composition may comprise less than 1 percent by weight of units derived from one or more α-olefin comonomers; or in the alternative, the polyethylene composition may comprise less than 0.5 percent by weight of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The polyethylene composition may comprise at least 80 percent by weight of units derived from ethylene. All individual values and subranges from at least 80 weight percent are included herein and disclosed herein; for example, the polyethylene composition may comprise at least 88 percent by weight of units derived from ethylene; or in the alternative, the polyethylene composition may comprise at least 89 percent by weight of units derived from ethylene; or in the alternative, the polyethylene composition may comprise at least 91 percent by weight of units derived from ethylene; or in the alternative, the polyethylene composition may comprise at least 93 percent by weight of units derived from ethylene; or in the alternative, the polyethylene composition may comprise at least 95 percent by weight of units derived from ethylene; or in the alternative, the polyethylene composition may comprise at least 97 percent by weight of units derived from ethylene; or in the alternative, the polyethylene composition may comprise at least 99 percent by weight of units derived from ethylene; or in the alternative, the polyethylene composition may comprise at least 99.5 percent by weight of units derived from ethylene.

The polyethylene composition of the instant invention is substantially free of any long chain branching, and preferably, the polyethylene composition of the instant invention is free of any long chain branching. Substantially free of any long chain branching, as used herein, refers to a polyethylene composition preferably substituted with less than about 0.01 long chain branching per 1000 total carbons, and more preferably, less than about 0.001 long chain branching per 1000 total carbons. In the alternative, the polyethylene composition of the instant invention is free of any long chain branching.

The polyethylene composition may further comprise greater than or equal to 1 parts by combined weight of at least three metal residues remaining from the multi-metallic polymerization catalyst per one million parts of polyethylene composition, where such metals are selected from the group consisting of titanium, zirconium, hafnium, vanadium, niobium, tantalum, chromium, molybdenum, tungsten, and combinations thereof, wherein each metal residual is present at least 0.4 ppm, for example, in the range of from 0.4 to 5 ppm. All individual values and subranges from greater than or equal to 1 ppm are included herein and disclosed herein; for example, the polyethylene composition may further comprise greater than or equal to 2 parts by combined weight of at least three metal residues remaining from the multi-metallic polymerization catalyst per one million parts of polyethylene composition. The at least three metals residues remaining from the multi-metallic polymerization catalyst in the inventive polyethylene composition may be measured by x-ray fluorescence (XRF), which is calibrated to reference standards. The polymer resin granules were compression molded at elevated temperature into plaques having a thickness of about ⅜ of an inch for the x-ray measurement in a preferred method. At very low concentrations of metal, such as below 0.1 ppm, ICP-AES would be a suitable method to determine metal residues present in the inventive polyethylene composition.

In one embodiment, the polyethylene composition in accordance with the instant invention may have 2 or more peaks on an elution temperature-eluted amount curve determined by continuous temperature rising elution fraction method at equal or above 30° C., wherein the purge peak which is below 30° C. is excluded.

The inventive polyethylene composition may further comprise additional components such as other polymers and/or additives. Such additives include, but are not limited to, antistatic agents, color enhancers, dyes, lubricants, fillers, pigments, primary antioxidants, secondary antioxidants, processing aids, UV stabilizers, and combinations thereof. The inventive polyethylene composition may contain any amounts of additives. The inventive polyethylene composition may comprise from about 0 to about 10 percent by the combined weight of such additives, based on the weight of the inventive polyethylene composition including such additives. All individual values and subranges from about 0 to about 10 weight percent are included herein and disclosed herein; for example, the inventive polyethylene composition may comprise from 0 to 7 percent by the combined weight of additives, based on the weight of the inventive polyethylene composition including such additives; in the alternative, the inventive polyethylene composition may comprise from 0 to 5 percent by the combined weight of additives, based on the weight of the inventive polyethylene composition including such additives; or in the alternative, the inventive polyethylene composition may comprise from 0 to 3 percent by the combined weight of additives, based on the weight of the inventive polyethylene composition including such additives; or in the alternative, the inventive polyethylene composition may comprise from 0 to 2 percent by the combined weight of additives, based on the weight of the inventive polyethylene composition including such additives; or in the alternative, the inventive polyethylene composition may comprise from 0 to 1 percent by the combined weight of additives, based on the weight of the inventive polyethylene composition including such additives; or in the alternative, the inventive polyethylene composition may comprise from 0 to 0.5 percent by the combined weight of additives, based on the weight of the inventive polyethylene composition including such additives. Antioxidants, such as Irgafos™ 168 and Irganox™ 1010, may be used to protect the inventive polyethylene composition from thermal and/or oxidative degradation. Irganox™ 1010 is tetrakis (methylene (3,5-di-tert-butyl-4-hydroxyhydrocinnamate) available from Ciba Geigy Inc. Irgafos™ 168 is tris (2,4 di-tert-butylphenyl) phosphite available from Ciba Geigy Inc.

Any conventional ethylene (co)polymerization reaction may be employed to produce the inventive polyethylene composition. Such conventional ethylene (co)polymerization reactions include, but are not limited to, slurry phase polymerization process, solution phase polymerization process, and combinations thereof using one or more conventional reactors, e.g., loop reactors, stirred tank reactors, batch reactors in parallel, series, and/or any combinations thereof. In one embodiment, the polymerization reactor may comprise two or more reactors in series, parallel, or combinations thereof. In one embodiment, the polymerization reactor is one reactor.

The polymers produced hereby may include a wide variety of products including, in particular embodiments, LLDPE, but also high density polyethylenes (HDPE), plastomers, medium density polyethylenes, propypropylene and polypropylene copolymers. For these and other applications articles may be prepared showing enhanced overall quality due to the narrower polydispersity and narrower molecular weight distribution of the polymer relative to density. Useful forming operations for the polymers may include, but are not limited to, film, sheet, pipe and fiber extrusion and co-extrusion as well as blow molding, injection molding and rotary molding may be pursued. Films include blown or cast films formed by co-extrusion or by lamination useful as shrink film, cling film, stretch film, sealing film, oriented film, snack packaging, heavy duty bags, grocery sacks, baked and frozen food packaging, medical packaging, industrial liners, agricultural film applications, and membranes, for example, in food-contact and non-food-contact applications. Fibers include melt spinning, solution spinning and melt blown fiber operations for use in woven and non-woven form to make filters, diaper fabrics, medical garments and geotextiles. Extruded articles include medical tubing, wire and cable coatings, geomembranes and pond liners. Molded articles include single and multi-layered constructions in the form of bottles, tanks, large hollow articles, rigid food containers and toys.

EXAMPLES

Two samples of the invention catalysts are prepared using the protocols given below (Examples 1 and 2) and three samples of non-invention catalysts are prepared using their protocols (Comparative Examples A-C). All five of the catalysts are then used to prepare LLDPE polymer in a solution polymerization, and then the LLDPE polymer is used to prepare a blown film. Testing is carried out on both the LLDPE polymer and the blown film, as further described hereinbelow.

Example 1

To 800 mL of $MgCl_2$ (0.20 M in ISOPAR™ E) is added $(C_2H_5)AlCl_2$ (40 mL of a 1.0 M solution in hexane). (ISOPAR™ is a tradename of ExxonMobil Chemical. ISOPAR™ E is a clear isoparaffinic fluid.) The resulting mixture is allowed to stir overnight at room temperature. Solutions of $TiCl_4$ (16 mL of a 0.25 M solution in ISOPAR™ E) and $VOCl_3$ (32 mL of a 0.25 M solution in ISOPAR™ E) are mixed and then added to the magnesium/aluminum suspension, followed by a solution of $Zr(TMHD)_4$ (bis(2,2,6,6-tetramethyl-3,5-heptanedionate)zirconium, 8 mL of a 0.25 M solution in ISOPAR™ E). The resulting mixture is allowed to stir overnight to complete the procatalyst aging.

Example 2

To 800 mL of $MgCl_2$ (0.20 M in ISOPAR™ E) is added $(C_2H_5)AlCl_2$ (24 mL of a 1.0 M solution in hexane). The resulting mixture is allowed to stir overnight at room temperature. Solutions of $TiCl_4$ (16 mL of a 0.25 M solution in ISOPAR™ E) and $VOCl_3$ (32 mL of a 0.25 M solution in ISOPAR™ E) are mixed and then added to the magnesium/aluminum suspension, followed by a solution of $Hf(TMHD)_4$ (bis(2,2,6,6-tetramethyl-3,5-heptanedionate)hafnium, 8 mL of a 0.25 M solution in ISOPAR™ E). The resulting mixture is allowed to stir overnight to complete the procatalyst aging.

Comparative Example A

To 800 mL of $MgCl_2$ (0.20 M in ISOPAR™ E) is added $(C_2H_5)AlCl_2$ (48 mL of a 1.0 M solution in hexane). The resulting mixture is allowed to stir overnight at room temperature. A solution of $Ti(OiPr)_4$ (titanium isopropoxide, 48 mL of a 0.25 M solution in ISOPAR™ E) is then added to the magnesium/aluminum suspension. The resulting mixture is allowed to stir overnight to complete the procatalyst aging.

Comparative Example B

To 800 mL of $MgCl_2$ (0.20 M in ISOPAR™ E) is added $(C_2H_5)AlCl_2$ (32 mL of a 1.0 M solution in hexane). The resulting mixture is allowed to stir overnight at room temperature. A solution of $TiCl_4$ (16 mL of a 0.25 M solution in ISOPAR™ E) is then added to the magnesium/aluminum suspension. The resulting mixture is allowed to stir overnight to complete the procatalyst aging.

Comparative Example C

To 800 milliliters (mL) of $MgCl_2$ (0.20 M in ISOPAR™ E) is added $(C_2H_5)AlCl_2$ (32 mL of a 1.0 M solution in hexane). The resulting mixture is allowed to stir overnight at room temperature. Solutions of titanium chloride ($TiCl_4$) (16 mL of a 0.25 M solution in ISOPAR™ E) and $VOCl_3$ (32 mL of a 0.25 M solution in ISOPAR™ E) are mixed and then added to the magnesium/aluminum suspension. The resulting mixture is allowed to stir overnight to complete the procatalyst aging.

Each of the catalysts prepared hereinabove is then used to prepare LLDPE polymer via a typical solution polymerization method. In this method three feeds—ethylene, hydrogen, and octene—are fed at a rate as shown in Table 1 hereinbelow into a polymerization zone maintained at a temperature of 185° C. The three flow rates are adjusted in order to produce a copolymer with a target $I_2$ of 1.0 and a density of 0.920 g/cm³.

As shown in Table 1, Example 1 and 2 both show improved catalyst efficiency (EFF) when compared with that of Comparative Examples A and B. Example 1 and 2 also show significantly narrower polydispersity (PDI less than 3.5, Table 1) in comparison with the Comparative Examples, and also lower molecular weight at density ratio ($M_w$ of high density fraction to $M_w$ of low density fraction, Table 2).

Number and weight-average molecular weights ($M_n$ and $M_w$, respectively) and polydispersity ($M_w/M_n$) of the polymers are determined by Gel Permeation Chromatography (GPC). The column and carousel compartments are operated at 140° C. The columns are 4 PL Gel Mixed B 10-micron columns. The solvent is 1,2,4-trichlorobenzene. The samples are prepared at a concentration of 0.1 g of polymer in 50 mL of solvent. The chromatographic solvent and the samples preparation solvent contains 200 ppm of butylated hydroxytoluene (BHT). Both solvent sources are nitrogen sparged. The samples are stirred for 2 hours at 160° C. The injection volume is 100 μL and the flow rate is 1.0 m L/min.

Gel Permeation Chromatography (GPC)

Number and weight-average molecular weights ($M_n$ and $M_w$, respectively) and polydispersity ($M_w/M_n$) of the polymers are determined by Gel Permeation Chromatography (GPC). The chromatographic system consists of either a Polymer Laboratories Model PL-210 or a Polymer Laboratories Model PL-220 high temperature chromatograph. Data collection is accomplished using Viscotek (Houston, Tex.) TriSEC software version 3 and a 4-channel Viscotek Data Manager DM400. The system is equipped with an on-line solvent degas device from Polymer Laboratories.

The column and carousel compartments are operated at 140° C. The columns used are 4 PL Gel Mixed B 10-micron columns. The solvent used is 1,2,4-trichlorobenzene. The samples are prepared at a concentration of 0.1 g of polymer in 50 mL of solvent. The chromatographic solvent and the samples preparation solvent contain 200 ppm of butylated hydroxytoluene (BHT). Both solvent sources are nitrogen sparged. The samples are stirred for 2 hours at 160° C. The injection volume used is 100 μL and the flow rate is 1.0 mL/min. Calibration of the GPC column set is performed with narrow MWD polystyrene standards with molecular weights ranging from 580 to 8,400,000 g/mol, purchased from Polymer Laboratories (Shropshire, UK). Data reduction is performed with Viscotek TriSEC software. The polystyrene standard peak molecular weights are converted to polyethylene molecular weights using the method disclosed in Williams, T., and Ward, I. M., "The Construction of Polyethylene Calibration Curve for Gel Permeation Chromatography Using Polystyrene Fractions", *J. Polym. Sci. Polym. Lett.*, 6, 621 (1968):

$$M_{polyethylene} = A(M_{polystyrene})^B$$

wherein M is the molecular weight, A has a value of 0.4316 and B is equal to 1.0. Polyethylene equivalent molecular weight calculations are performed using Viscotek TriSEC software Version 3.0.

CEF Method

Comonomer distribution analysis is performed with Crystallization Elution Fractionation (CEF). The method includes first combining ortho-dichlorobenzene (ODCB) with 600 ppm antioxidant butylated hydroxytoluene (BHT) used as solvent. Samples are prepared using an autosampler at 160° C. for 2 hours under shaking at 4 mg/mL). The injection volume is 300 microliters. The temperature profile used for the CEF is as follows: Crystallization at 3° C./min from 110° C. to 30° C.; thermal equilibrium at 30° C. for 5 minutes; and elution at 3° C./min from 30° C. to 140° C. The flow rate during crystallization is 0.052 m L/min and during elution 0.50 m L/min. The data is collected at one data point/second.

A CEF column is packed with acid-washed glass beads at 125 um±6% s with ⅛ inch stainless tubing. Column volume is 2.06 mL. Column temperature calibrations are performed using a mixture of NIST Standard Reference Material Linear polyethylene 1475a (1.0 mg/mL) and Eicosane (2 mg/mL) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (≥97.0% purity, 1 mg/mL). A baseline separation of hexacontane and NIST polyethylene 1475a is achieved. The area of hexacontane (from 35.0° C. to 67.0° C.) to the area of NIST 1475a from 67.0° C. to 110.0° C. is determined to be 50:50, with the amount of soluble fraction below 35° C. being less than 1.8 wt %. Column resolution is 6.0.

$$\text{Resolution} = \frac{\text{Peak Temperature of } NIST\ 1475a - \text{Peak Temperature of Hexacontane}}{\text{Half-height Width of } NIST\ 1475a + \text{Half-height Width of Hexacontane}}$$

TABLE 1

| Ex. | R1 temp °C. | Al:Ti Flow g/hr | Eff *10⁶ | $I_2$ | Density g/cm³ | C2 Feed kg/hr | H2 Feed mL/min | C8 Feed kg/hr | $I_{10}/I_2$ | CEF % HD | CEF MWCCR | PDI |
|---|---|---|---|---|---|---|---|---|---|---|---|---|
| Comp. A | 185 | 10 | 0.49 | 1.01 | 0.9198 | 3.5 | 9.5 | 1.6 | 8.04 | 24.7 | 0.73 | 3.86 |
| Comp. B | 185 | 9.9 | 0.49 | 1.33 | 0.9210 | 3.5 | 0 | 1.30 | 9.15 | 12.5 | 0.50 | 4.17 |
| Comp. C | 185 | 10.0 | 1.13 | 0.97 | 0.9198 | 3.5 | 14 | 1.35 | 7.22 | 19.8 | 0.71 | 3.41 |

TABLE 1-continued

| Ex. | R1 temp °C. | Al:Ti Flow g/hr | Eff *10⁶ | $I_2$ | Density g/cm³ | C2 Feed kg/hr | H2 Feed mL/min | C8 Feed kg/hr | $I_{10}/I_2$ | CEF % HD | CEF MWCCR | PDI |
|---|---|---|---|---|---|---|---|---|---|---|---|---|
| Ex. 1 | 185 | 10.1 | 1.10 | 1.04 | 0.9196 | 3.5 | 23.5 | 1.05 | 6.81 | 24.8 | 0.82 | 3.03 |
| Ex. 2 | 185 | 10.5 | 0.99 | 0.96 | 0.9198 | 3.5 | 12.5 | 1.30 | 7.23 | 22.6 | 0.87 | 3.388 |

$I_2$ Melt flow index tested according to ASTM D1238; dg/min (190° C., 2.16 kg)
$I_{10}$ Melt flow index tested according to ASTM D1238; dg/min (190° C., 10 kg)
$I_{10}/I_2$ Melt flow ratio calculated from melt flow indices $I_{10}$ and $I_2$
Density tested according to ASTM D792 Method B; g/cm³
PDI = weight average molecular weight/number average molecular weight (Mw/Mn)

% HD Calculation:

High density fraction The % HD is determined from the CEF plot, calculated as a weight fraction (W) of the polymer eluting between temperatures (T) of 93° C. to 110° C.:

$$\frac{\int_{93}^{110} W(T)dt}{\int_{25}^{110} W(T)dt} = \% \ HD$$

MWCCR Calculation:

The molecular weight at comonomer content ratio (MWCCR) is defined as the average $M_w$ of a low density fraction (eluting from 60° C. to 70° C. on the CEF plot for copolymers with densities greater than 0.910 g/cc, and eluting from 30° C. to 60° C. on the CEF plot for copolymers with densities less than 0.910 g/cc) divided the overall $M_w$ of the copolymer as determined by GPC.

For copolymers with density greater than 0.910 g/cc:

$$\frac{Mw \ (60° \ C. \rightarrow 70° \ C.)}{Mw \ (overall)} = MWCCR$$

For copolymers with density less than 0.910 g/cc:

$$\frac{Mw \ (30° \ C. \rightarrow 60° \ C.)}{Mw \ (overall)} = MWCCR$$

Samples of the LLDPE polymer beads prepared for Examples 1 and 2 and Comparative Examples A-C are subjected to neutron activation analysis. Approximately 3.5 g of the polymer are transferred into pre-cleaned 2-dram polyethylene vials. Standard aliquots of Al, Mg, Ti, V, Hf and Zr standards are prepared from their standard solutions (National Institute of Standards and Technology (NIST) traceable standard solutions from SPEX CertiPrep Group) and also placed into 2-dram polyethylene vials. Each of the vials is diluted with milli-Q pure water to 6 mL and the vials are heat-sealed. The samples and standards are then analyzed following the standard NAA procedure, Global-SOP-01101.01 for the given elements, using the Mark I TRIGA™ nuclear reactor. (TRIGA™ is a tradename of General Atomics.)

For Al, Mg, Ti, Hf, Zr and V analysis, the samples are transferred to non-irradiated vials before doing the gamma-spectroscopy. The reactions and experimental conditions used for each of the elements are as described in Table 2. The elemental concentrations are calculated using CANBERRA™ software (CANBERRA™ is a tradename of Canberra, an Areva Group Company) and standard comparative technique, and the results are shown in Table 3. Interference correction is carried out for the aluminum interference with magnesium using the CANBERRA™ software.

TABLE 2

| Ex. | Al, ppm | Mg, ppm | Ti, ppm | V, ppm | Hf, ppm | Zr, ppm |
|---|---|---|---|---|---|---|
| Comp. A | 9.2 ± 0.4 | 17 ± 1 | 2.1 ± 0.1 | Nd @ 0.01 | Nd @ 0.02 | Nd @ 0.4 |
| Comp. B | 16.0 ± 0.8 | 35 ± 2 | 1.4 ± 0.1 | 0.04 ± 0.01 | Nd @ 0.02 | Nd @ 0.4 |
| Comp. C | 8.5 ± 0.4 | 20 ± 1 | 0.97 ± 0.05 | 1.37 ± 0.06 | Nd @ 0.02 | Nd @ 0.04 |
| Ex. 1 | 10.4 ± 0.5 | 22 ± 1 | 0.88 ± 0.05 | 1.62 ± 0.07 | 0.038 ± 0.003 | 0.52 + 0.05 |
| Ex. 2 | 9.7 ± 0.4 | 26 ± 1 | 0.78 ± 0.03 | 2.02 ± 0.09 | 1.7 ± 0.2 | Nd @ 0.4 |

The polymers produced in Examples 1 and 2 and Comparative Examples A-C are further processed via a blown film extrusion process on a Collin three layer blown film line. The blown film line consists of three groove fed extruders with single flight screws (25:30:25 mm). The length/diameter ratio for all screws is 25:1. The blown film line has a 60 mm die with a dual lip air ring cooling system. The die has a die gap of 2 mm. The films are blown with a blow up ratio of 2.5 and a frost line height of 7 inches. Film thickness is 2 mil (0.05 millimeter) and layflat width of the films is about 23.5 cm.

The products of this protocol are correspondingly labeled as Examples 3 and 4 and Comparative Examples D-F. The films are then tested and the results recorded in Table 3.

TABLE 3

| Example | Dart A Impact strength (g) | MD Tear strength (g) | CD Tear strength (g) | Total Haze (%) | Gloss 20 (%) | Gloss 45 (%) |
|---|---|---|---|---|---|---|
| Comp. D | 421 | 449 | 578 | 9.1 | 87.8 | 69.4 |
| Comp. E | 286 | 407 | 538 | 11.1 | 74.9 | 63.4 |
| Comp. F | 607 | 430 | 555 | 7.1 | 105.6 | 75.3 |
| Ex. 3 | 571 | 446 | 558 | 6.5 | 115.6 | 78.6 |
| Ex. 4 | 673 | 407 | 559 | 5.7 | 125.0 | 82.5 |

Dart A Impact strength: per ASTM D1709, using a 1.5-inch diameter dart head, dropped from a maximum height of 26 inches.
MD and CD Tear strength: Elmendorf Tear, per ASTM D1922, based on a ProTear electronic tear tester from Thwing-Albert.
Haze: per ASTM D1003; measurements made on a Haze Gard instrument from BYD-Gardner Company.
Gloss 20 and Gloss 45: per ASTM D2457.

Table 3 shows the significantly better optical properties, particularly Gloss 20 and Gloss 45, attained with the trimetallic catalyst of the inventive Examples 3 and 4 catalysts, in comparison with the mono- and bi-metallic Comparatives D-F catalysts. This improvement may be attributable to the reduced polydispersity and molecular weight at density ratio found in the polymers made with the catalysts. Example 4 also shows improved Dart A impact strength, making the combination of Dart A impact and optical improvements, while maintaining Elmendorf tear strength an attractive option for some applications.

What is claimed is:

1. A process to prepare a multi-metallic procatalyst comprising
   (a) reacting a hydrocarbon-soluble organomagnesium compound or complex thereof and an active non-metallic or metallic halide to form a halogenated magnesium support;
   (b) contacting the magnesium halide support with a conditioning compound containing an element selected from the group consisting of boron, aluminum, gallium, indium and tellurium under conditions sufficient to form a conditioned magnesium halide support;
   (c) contacting the conditioned magnesium halide support and a compound containing, as a first metal, titanium, to form a supported titanium compound;
   (d) contacting the supported titanium compound and a second metal and a third metal independently selected from the group consisting of zirconium, hafnium, vanadium, niobium, tantalum, chromium, molybdenum, and tungsten, provided that the second metal and the third metal are not the same; and further provided that the molar ratio of the magnesium to a combination of the titanium and the second and third metals ranges from 30:1 to 5:1; under conditions sufficient to form a multi-metallic procatalyst.

2. A multi-metallic procatalyst obtained according to the process of claim 1.

3. The procatalyst of claim 2 wherein the molar ratio of magnesium to titanium ranges from 8:1 to 80:1.

4. A multi-metallic polymerization catalyst comprising the reaction product of the multi-metallic procatalyst of claim 2 and an organometallic cocatalyst.

5. A polyethylene polymer prepared by a process wherein ethylene and optionally one or more olefin comonomers are polymerized in the presence of the multi-metallic polymerization catalyst of claim 4.

6. The polyethylene polymer of claim 5 having a polydispersity (PDI) of less than 3.5, and a MWCCR in the range of 0.75 to 1.10.

7. The polyethylene polymer of claim 5 or 6 characterized as greater than or equal to 1 parts by combined weight of at least three metal residues remaining from the multi-metallic polymerization catalyst per one million parts of polyethylene polymer, where such metals are selected from the group consisting of titanium, zirconium, hafnium, vanadium, niobium, tantalum, chromium, molybdenum, tungsten, and combinations thereof, and wherein each said residual metal is present at least 0.4 ppm.

8. The polyethylene polymer of claim 5 or 6, wherein said polyethylene is characterized by one of the following properties:
   (a) a density in the range of from 0.900 to 0.960 g/cm$^3$; or
   (b) a melt index ($I_2$) in the range of from 0.1 to 50 g/10 minutes; or
   (c) a melt flow ratio ($I_{10}/I_2$) in the range of from 6 to 10.

9. A composition comprising the polyethylene polymer of claim 5 or 6, and one or more polymers or one or more additives.

10. An article comprising the polyethylene polymer of claim 5 or 6.

* * * * *